(12) United States Patent
Hughes et al.

(10) Patent No.: US 7,260,395 B1
(45) Date of Patent: Aug. 21, 2007

(54) APPARATUS AND METHOD FOR WIRELESS LOCAL AREA NETWORKS OF DIFFERENT COUNTRIES

(75) Inventors: John K. Hughes, San Jose, CA (US); Gurpreet Singh, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1222 days.

(21) Appl. No.: 09/702,215

(22) Filed: Oct. 30, 2000

Related U.S. Application Data

(63) Continuation-in-part of application No. 09/172,180, filed on Oct. 13, 1998, now Pat. No. 6,484,029.

(51) Int. Cl.
*H04Q 7/20* (2006.01)

(52) U.S. Cl. .............. 455/432.2; 455/434; 455/435.1; 455/456.1

(58) Field of Classification Search .............. 455/434, 455/432.1, 432.2, 432.3, 433, 435.1, 435.2, 455/456.1, 456.2, 456.5, 456.6, 457
See application file for complete search history.

(56) References Cited

U.S. PATENT DOCUMENTS

| | | | |
|---|---|---|---|
| 5,020,093 A | 5/1991 | Pireh ........................... 379/59 |
| 5,029,183 A | 7/1991 | Tymes ........................... 375/1 |
| 5,635,940 A | 6/1997 | Hickman et al. ........... 342/389 |
| 5,699,408 A | 12/1997 | Krolopp et al. ............... 375/59 |
| 5,732,349 A | 3/1998 | Sanpei et al. ............... 455/435 |
| 5,857,155 A | 1/1999 | Hill et al. .................... 455/456 |
| 5,918,159 A | 6/1999 | Fomukong et al. ........ 455/38.1 |
| 6,035,212 A | 3/2000 | Rostoker et al. ............ 455/552 |
| 6,091,951 A | 7/2000 | Sturniolo et al. ........... 455/432 |
| 6,148,203 A * | 11/2000 | Renko et al. ............... 455/434 |
| 6,292,666 B1 * | 9/2001 | Siddiqui et al. ......... 455/456.4 |
| 6,574,266 B1 * | 6/2003 | Haartsen ..................... 375/133 |

OTHER PUBLICATIONS

Horn, K., "Draft Supplement To Standard for Telecommunications and Information Exchange Between Systems—LAN/MAN Specific Requirements, Part 11: Wireless Medium Access Control (MAC) and Physical layer (PHY) specifications:, Specification for Operation in Additional Regulatory Domains," IEEE 802.11 Task Group d, pp. 1-34 (Mar. 2000).

(Continued)

*Primary Examiner*—Temica Beamer
(74) *Attorney, Agent, or Firm*—Fay Kaplun & Marcin, LLP

(57) ABSTRACT

The present invention relates to apparatus and methods for adapting a mobile unit to communication requirements of a particular country or geographic region. A wireless local area network communications system may include access points and remote terminals. Remote terminals may use country-specific information in messages from an access point to adapt to the communications requirements of the country in which the access point is operating. The country-specific information may be in a broadcast transmission or a message sent in reply to a remote terminal probe message. The country-specific information may include operating requirements such as channel information, power information, country name, modulation information, etc.

43 Claims, 7 Drawing Sheets

OTHER PUBLICATIONS

Zegelin, C., "A Simple Approach for World Wide Deployment," IEEE 802.11 Task Group d, pp. 1-7 (Nov. 1999).

O'Hara, B., "Submission," IEEE 802.11 Task Group d, pp. 1-4 (Sep. 15, 1999).

Engwer, D. and Zweig, J, "Algorithmically Derived Hop Sequences," IEEE 802.11 Task Group d, pp. 1-10 (Sep. 13, 1999).

O'Hara, B., "Universal DSSS and HRDS Channelization," IEEE 802.11 Task Group d, pp. 1-3 (Sep. 3, 1999).

O'Hara, B. "Task Group d Report, Sep. 13-17, 1999 Santa Rosa, CA," IEEE 802.11 Task Group d, Slides 1-7 (Sep. 1999).

O'Hara, B. "Universal DS Channelization," IEEE 802.11 Task Group d, Slides 1-5 (Sep. 1999).

Skellern, D., "TGd—Additional Regulatory Domains for 802.11—Meeting #2, Jul. 1999 Montreal Meeting Minutes," IEEE 802.11 Task Group d, pp. 1-2 (Jul. 6, 1999).

Kawaguchi, D., "FH Hopping Patterns for New Regulatory Domains," IEEE 802.11 Task Group d, pp. 1-2 (Jul. 5, 1999).

O'Hara, B. "TGd Report Jul. 1999 Meeting Montreal, Quebec, Canada," IEEE 802.11 Task Group d, Slides 1-6 (Jul. 1999).

O'Hara, B., "TGd Agenda, Jul. 1999 Meeting Montreal, Quebec, Canada," IEEE 802.11 Task Group d, Slides 1-4 (Jul. 1999).

Petrick, A., "TGd—May Interim Meeting Minutes," IEEE 802.11 Task Group d, pp. 1-2 (May 5, 1999).

O'Hara, B., "Proposed PAR for Supplement to 802.11 for Additional Regulatory Domains," IEEE 802.11 Task Group d, pp. 1-4 (Jan. 13, 1999).

* cited by examiner

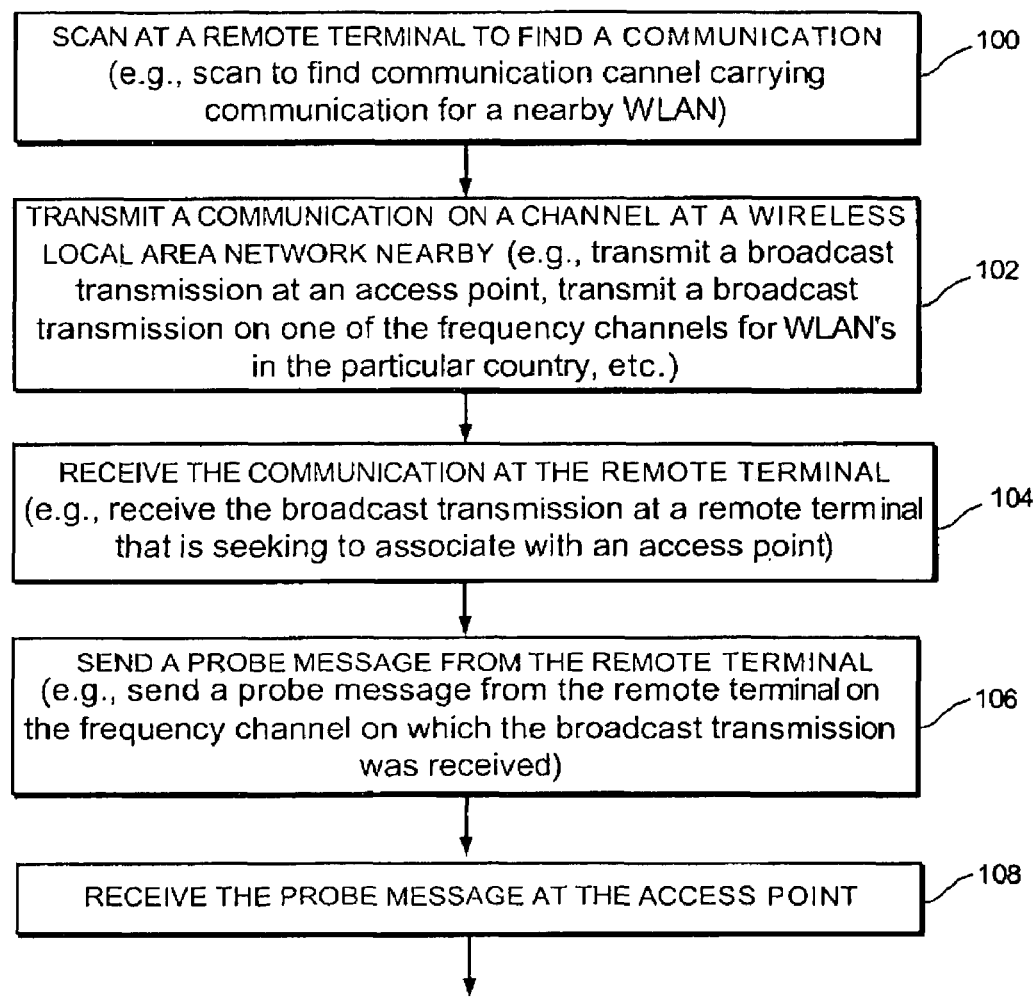
F I G. 6a

APPARATUS AND METHOD FOR WIRELESS LOCAL AREA NETWORKS OF DIFFERENT COUNTRIES

CROSS-REFERENCE TO RELATED APPLICATIONS

This is a continuation in part of U.S. patent application Ser. No. 09/172,180, filed Oct. 13, 1998, now U.S. Pat. No. 6,484,029 hereby incorporated by reference herein in its entirety, and is related to U.S. patent application Ser. No. 08/747,034, filed Nov. 8, 1998, now U.S. Pat. No. 6,002,918, hereby incorporated by reference herein in its entirety.

BACKGROUND OF THE INVENTION

The invention relates to communication systems, and more particularly to wireless local area network (WLAN) communications systems in which communications characteristics are based on WLAN specifications for the country in which the system is operating.

A WLAN communications system may be implemented by remote terminals (e.g., mobile units) that send messages to and receive messages from base stations or access points using wireless infrared or radio communication links. Each access point or base station covers a limited area, so a typical network may have several base stations or access points.

One protocol that may be used in such communications systems is the IEEE 802.11 Standard as published. The IEEE 802.11 is a standard that defines physical and data link layers for wireless local networks (e.g., networks that include access points and remote terminals). The standard defines, among other things, the wireless local area network (LAN) medium access control (MAC) and physical (PHY) layer specifications.

In the 802.11 standard, for a remote terminal to transmit a message, the remote terminal may first have to become associated with an access point. Association refers to the process of synchronizing a remote terminal with an access point for communication, and is initiated by the remote terminal. The remote terminal may first listen to broadcasts over the airwaves and determine which access points are within range of the remote terminal, and then request association with a particular access point according to certain criteria. At any point in time, a remote terminal is typically associated with only one access point. A single access point can be associated with multiple remote terminals.

With the ever-growing global market, it is common for WLAN users to travel from country to country. A problem therefore occurs, in that one country may allocate a different portion of the frequency spectrum to wireless communications than another country. Different frequency bands or overlapping frequency bands may have been assigned for use by WLAN communication systems of different countries. Typically, WLAN communication systems are assigned to frequencies that do not require the system user to obtain a license from the government to operate the communications system. The unlicensed frequencies for WLAN communications systems of a particular country are typically available for use throughout that country by any WLAN communication system user. Additionally, different countries may have different regulations that provide specifications for operating WLAN systems in that country (e.g., parameters for spread spectrum communications may differ, power requirements may differ, etc.). These allocations and specifications may prevent a remote terminal that is designed for use in one country from working (or being allowed to work or suitably operating) in a WLAN communications system in another country.

What is needed, then, is a system and method for allowing remote terminals to meet regulatory requirements, and adapt to and communicate with access points having different communications characteristics.

SUMMARY OF THE INVENTION

The present invention relates to an apparatus and method for adapting a remote terminal to communications requirements of a particular country or geographic region. In one aspect of the invention, a wireless data communications network including a remote terminal and one or more access points is operated to receive, at the remote terminal, announcement messages that have been broadcast by one or more of the access points. Each of the messages may have a unique frequency characteristic associated with the geographic location of the access point from which it was sent. The unique frequency characteristic may be used in the remote terminal to determine an allowable frequency set in the geographic region associated with the access point from which each of said messages was sent, and to adjust the frequency set of the remote terminal to send messages on said allowable frequency set. Other operating characteristics may be adjusted in similar fashion.

In another aspect of the invention, country-specific information in communications messages may be used to adapt remote terminals to operate based on WLAN operating specifications of different countries. A communications message having country specific information may be a broadcast transmission (e.g., an announcement message) of an access point. If desired, the communications message may be a reply communications message sent by an access point in reply to a probe communications message from a remote terminal. The probe communications message may have been sent after the remote terminal received a communication (e.g., a broadcast transmission, a communications message from another remote terminal, etc.) from a component of a nearby WLAN (e.g., an access point of a nearby WLAN) and the probe communications message may have been sent on a frequency channel on which the remote terminal received the communication. The remote terminal may have been scanning a range of frequencies on which the remote terminal is operable (e.g., frequencies for different countries) to receive a communication. The remote terminal may have been scanning frequencies seeking to associate with an access point to commence wireless operation. Some country-specific information may have been stored at the remote terminal to aid in adapting the remote terminal when country-specific information has been received from an access point.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which:

FIGS. 6a and 6b show a flow diagram of an illustrative method for adapting remote terminals based on country-specific information sent in reply to a probe message in accordance with the present invention.

DETAILED DESCRIPTION OF THE INVENTION

The IEEE 802.11 standard as published provides specifications for WLAN communications world-wide. However, there are some variations in WLAN operation from country to country. These variations may have been provided by regulations in each country, in the IEEE 802.11 standard, or otherwise. Manufacturing different WLAN components for each country is costly, time-consuming, expensive, inefficient, etc. In accord with the principles of the present invention, to substantially alleviate demands such as those discussed above, universal remote terminals may be provided that automatically adapt to operate in different countries.

Figure 1:
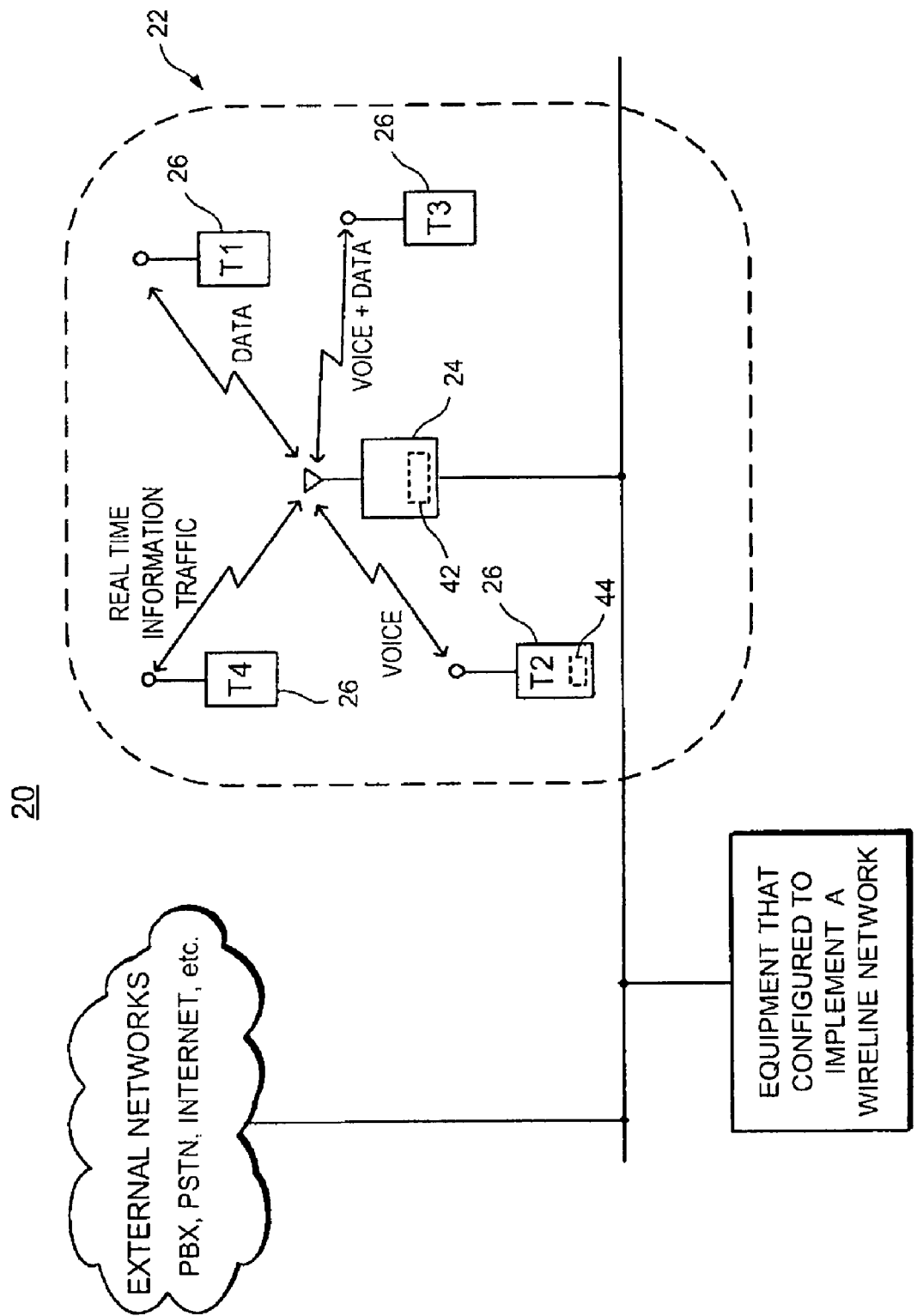
FIG. 1 is a diagram of an illustrative communications network that includes an illustrative wireless local area network communications system in accordance with the present invention.

With reference to FIG. 1, WLAN communications system 20 may include a plurality of cells 22 (only one is shown for simplicity). Cell 22 may include an access point 24 (which is sometimes referred to as a wireless local bridge) that was installed in a particular country to operate based on WLAN specifications for that country. Cell 22 may include remote terminals 26 that are associated with access point 24 and are operating based on WLAN specifications of the country of access point 24. Each terminal 26 may be a mobile, portable, or stationary terminal. Terminals may be implemented as programmable processor-based units executing software modules. Each terminal 26 may be a desktop workstation, laptop computer, personal computer, palm top computer, handheld personal computer, pen-based computer, personal digital assistant, handheld scanner, data collector, handheld printer, etc. Each terminal 26 may include wireless-network-interface resources that are configured to provide two-way radio or infrared signal communications. Such resources may include an interface card (or an external modem), a software driver, and an antenna. Other suitable resources may also be used, but for clarity and brevity, the wireless network interface resources will be discussed primarily in the context of an interface card, a software driver, and an antenna. The interface card may have been configured to use a standard computer-bus interface (e.g., ISA, PCMCIA, etc.) or standard computer port (e.g., RS232, RS422, etc.) to provide convenient access to terminal equipment. If desired remote terminal 26 may include suitable hardware and/or software to include database 44 that includes information on communications specifications of different countries.

A network-operating-system may be implemented on each terminal 26. In each terminal 26, the interface card may be coupled to the network-operating-system using the software driver. The interface card for each remote terminal 26 may be a network-communications interface. The network interface card for each terminal 26 is typically implemented to use a carrier sense access protocol and to modulate communications signals with a spreading sequence.

Access point 24 may be an interface for communicating between wireless network 20 and a wireline network. Access point 24 may be configured to provide a communications gateway between terminals 26 that are in cell 22 and between a wireline network and the terminals 26. Access point 24 may include a resource(s) (e.g., software, hardware, or a combination thereof) that is configured to connect the access point to a wireline network (e.g., on ethernet network, a token ring network, etc.). Access point 24 is typically configured to convert signals between wireline and wireless communications mediums. The conversion may allow the access point to pass communication information between the wireline network and wireless remote terminals 26.

Access points are typically provided with sufficient processing, hardware, software, etc. to operate in compliance with the IEEE 802.11 (e.g., to provide 802.11 roaming, standard 802.11 data rates, etc.), to provide country-specific characteristics, and to provide additional features that are developed by a vendor. Access point 24 may be implemented using a personal computer (e.g., a Power PC, an IBM compatible computer), server, workstation, etc., having an appropriate operating system, wireless-network-interface resources, wireline-network-interface resources, network-operating-system applications, etc. If desired, access point 24 may include suitable hardware and/or software for database 42 that may include information on communications specifications that are particular to the country in which access point 24 is installed. In systems in which access point 24 includes database 42, remote terminal 26 may be without database 44, or if desired, there may be a database that is partially implemented in access point 24 and partially implemented in remote terminal 26.

Access point 24 and remote terminals 26 may be configured to communicate using spread spectrum modulation techniques (e.g., direct sequence spread spectrum modulation, frequency hopping spread spectrum modulation, etc.).

The IEEE 802.11 standard includes specifications describing communications packets (e.g. format, content, etc.). Communications packets, which may also be referred to as frames or messages, may be of variable size with the size of each packet being identified in packet header information. In some embodiments, the body of each packet may vary from 0 to 2312 octets.

Each terminal 26 may have different communications capabilities and requirements. Access point 24 may manage the communications traffic between terminals 26 and the wireline network. Access point 24 may manage the communications traffic by controlling when packets are transmitted to each remote terminal 26 that is associated with access point 24 in cell 22. The communications traffic in cell 22 may include data packets (e.g., signals that carry packets to provide data communications), voice packets (e.g., signals that carry packets to provide voice communications), real-time packets (e.g., signals that carry packets to provide real-time communications such as multimedia or voice communications), management packets (e.g., signals that carry packets to provide network management communications), etc.

The wireline network that is coupled to access point 24 may include equipment 23 that is configured to implement the wireline network. The wireline network may be coupled to an external network (e.g., PBX, PSTN, Internet, etc.).

For clarity and brevity, the apparatus and methods discussed hereinafter are discussed primarily in the context of messages, rather than being discussed for example in the context of frames or packets.

Figure 2:
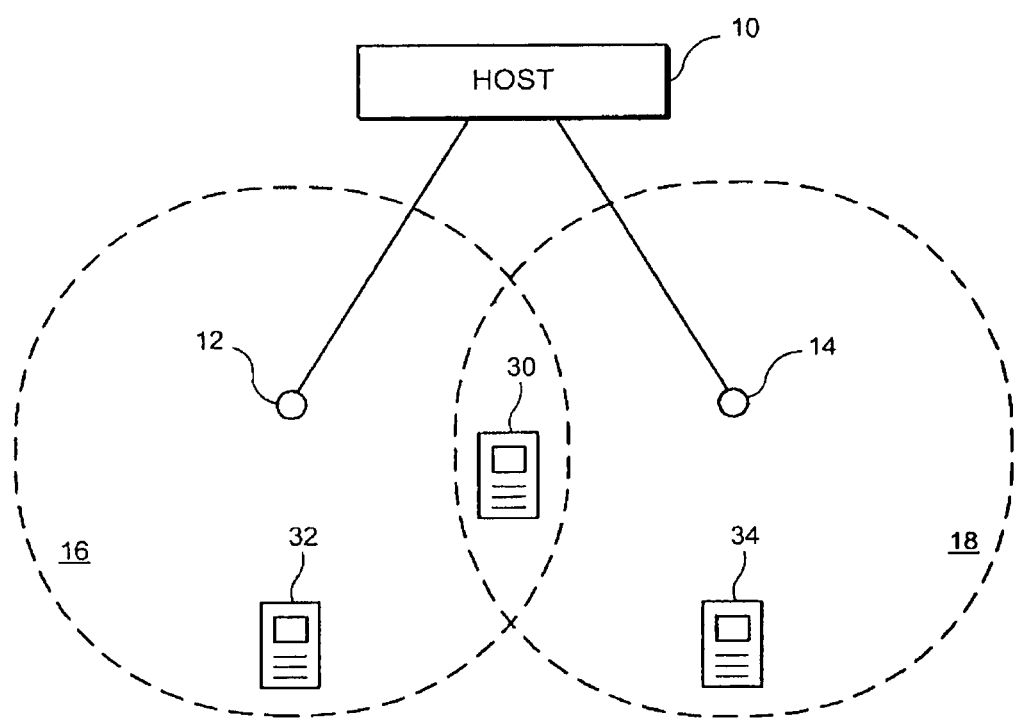
FIG. 2 is a diagram of an illustrative wireless local area network communications system in accordance with the present invention.

FIG. 2 is a block diagram showing a wireless network architecture. Host 10, which is for example, equipment that is configured to provide communications between access points, is connected to access point 12 and access point 14. Access point 12 handles wireless communications within area 16, and access point 14 handles communications within area 18. As shown in FIG. 2, therefore, access point 12 is in communication range of remote terminal 30 and remote terminal 32, and access point 14 is in communication range of remote terminal 30 and remote terminal 34. Remote terminal 30 is in communication range of either access point 12 or access point 14, although remote terminal 30 preferably only communicates with one of them at a time.

In one scenario, remote terminal 20 associates with access point 12 and thereafter communicates with access point 12 to transmit messages to the host or to other remote terminals. If remote terminal 20 is associated with access point 12, remote terminal 30 could transmit a message to remote terminal 32 via access point 12, or to remote terminal 34 via access point 12, host 10, and access point 14. A wireless local area network communications system typically comprises a grouping of hosts and/or remote terminals.

Systems such as those depicted in FIGS. 1 and 2 may be installed throughout the world. Each country, however, (as discussed above) typically has different operating parameters for use of such systems in that country. According to an embodiment of the present invention, a remote terminal may be configured with circuitry (e.g., hardware and/or software) to be operable on a variety of different frequencies. Remote terminals may include wireless-network-interface resources comprising the circuitry. The range of frequencies should be large enough to encompass some of the frequencies available for wireless communications in each country or geographic region in which the remote terminal is to operate. The remote terminal may be configured to operate at a variety of different power settings, with the range of power settings being large enough to encompass at least some allowable power settings in each country in which the remote terminal is to operate. The remote terminal may be configured to operate at a variety of spread spectrum communications settings, again with the variety of settings being large enough to encompass at least some operable settings in each country in which the remote terminal is to operate. These features allow the remote terminal to operate in a variety of different countries or geographic regions.

Figure 3:
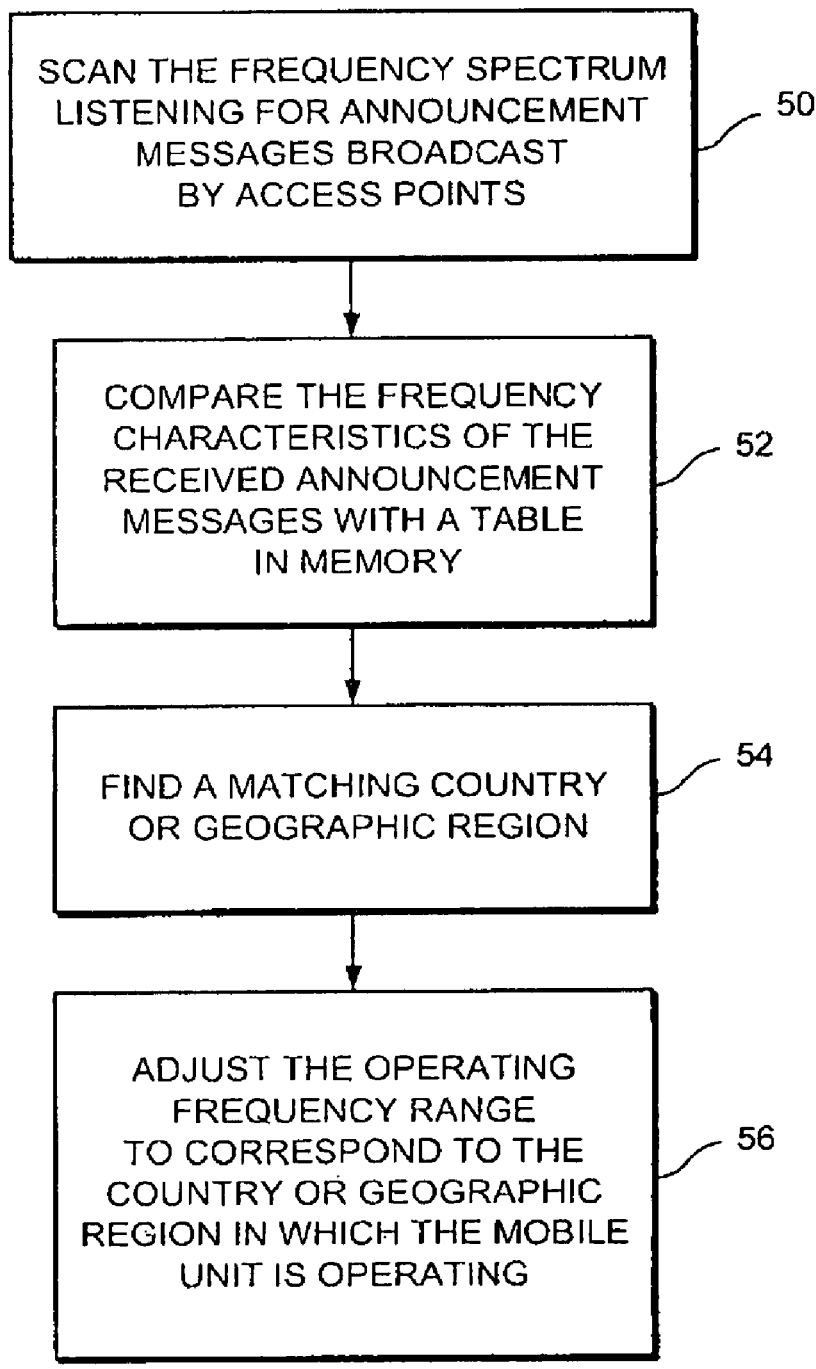
FIG. 3 is a flow diagram of an illustrative method for operating a wireless network communications system in accordance with the present invention.

Remote terminals may automatically adapt to use in individual countries or geographic regions by running a program or method contained in software and/or hardware within the remote terminal, such as circuitry of the remote terminal having suitable hardware and/or software. The wireless-network-interference resources of a remote terminal may comprise this circuitry. FIG. 3 is a flow diagram showing illustrative steps involved in adapting a remote terminal for use in individual countries or geographic regions based on frequency characteristics of messages. At step 50, the remote terminal may scan the frequency spectrum, listening for broadcast transmissions or announcement messages broadcast by access points. This may encompass tuning to each available frequency on which an announcement message from a nearby access point may be received. The announcement message may have a frequency characteristic that is unique to a particular geographic region or country (e.g., transmitted on a frequency channel that is unique to a particular country).

At step 52, the frequency characteristics of the received announcement message are compared with a table, database, or equivalent data structure contained in memory. The table may contain a listing of the breakdown of the frequency spectrum for all the different available countries or geographic regions. It also may list regulations on power output or other regulations important to the functioning of the remote terminal. At step 54, a matching country or geographic region is found. At this point, the remote terminal has determined what country or geographic region in which it is operating. At step 56, the remote terminal adjusts its operating frequency range to correspond to the country or geographic region in which it is operating. It may also alter other operating characteristics, such as power output and modulation type, in accordance with the regulations listed in the table or other data structure corresponding to the country in which the remote terminal is located.

After the geographic region frequency, power settings or any other operating characteristics have been adapted for use in the country or geographic region in which the terminal is located, the remote terminal operates similarly to a conventional remote terminal.

Figure 4:
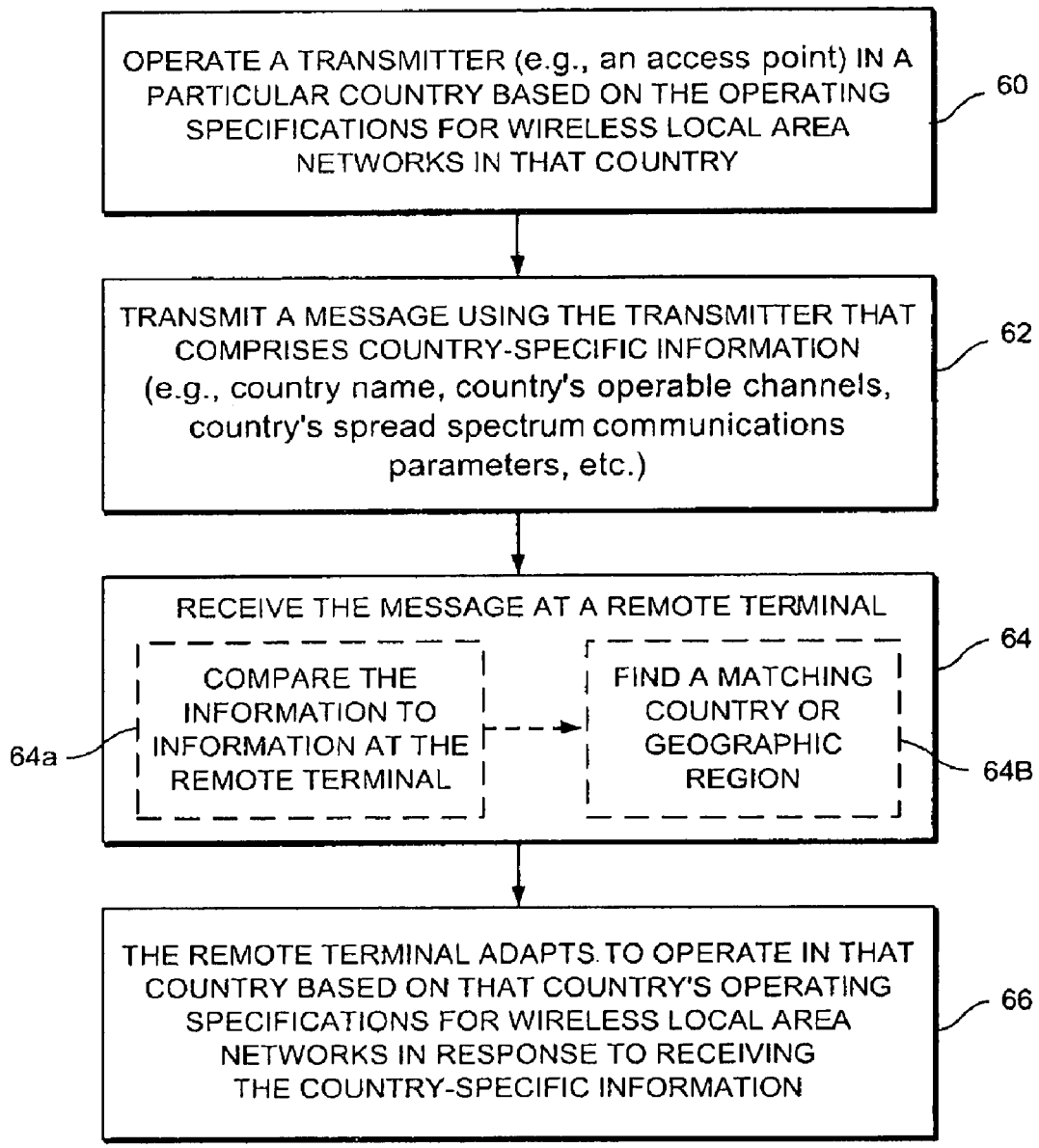
FIG. 4 is a flow diagram of an illustrative method for adapting remote terminals based on country-specific information in accordance with the present invention.

FIG. 4 is a flow chart showing illustrative steps involved in adapting a remote terminal for use in individual countries or geographic regions based on country-specific information from access points. At step 60, a transmitter, such as an access point, that has been installed in a particular country may be operated based on operating specifications for WLANs in that particular country. At step 62, the transmitter may transmit a communications message comprising information that is specific to the country in which the transmitter is operating. The information that is specific to the country may be provided as bit flags or encoded words in a transmitter communications message. The information may include country name, WLAN operating channels for that country, country settings for variable spread spectrum communications parameters, etc. If desired, the format of the information in the message may be predetermined by WLAN vendors or operators (e.g., the information may be formatted to identify the first channel in the operating bands for that country with the information further including values from which the location of other channels for that country may be identified).

Country-specific information may include direct sequence spread spectrum communications parameters such as, the sequence and channel numbers, may include frequency hopping spread spectrum communications parameters such as, the frequency hop characteristics, may include the first channel, the number of channels, a table of channels, the type of spread spectrum communications, etc.

At step 64, a remote terminal may receive the communications message comprising the country specific information. In response to receiving the communications message, the remote terminal adapts (e.g., remote terminal circuitry is configured to adapt) to operate in that country based on that country's operating specifications for WLANs. If desired, the remote terminal may include a table, database, datastructure, etc. of information on some or all of the operating requirements of different countries. If desired, at substep 64a, the remote terminal may compare the information received from the transmitter in the communication message to information at the remote terminal. For example, the transmitter may have sent a message carrying the name of the current country and the remote terminal may compare the received name to names of countries that are stored at the remote terminal. If desired, at substep 64*b*, the remote terminal may find a matching country name that has WLAN operating specifications associated with it for that country. Substeps 64*a* and 64*b* may be individual steps that are separate from step 64.

Figure 5:
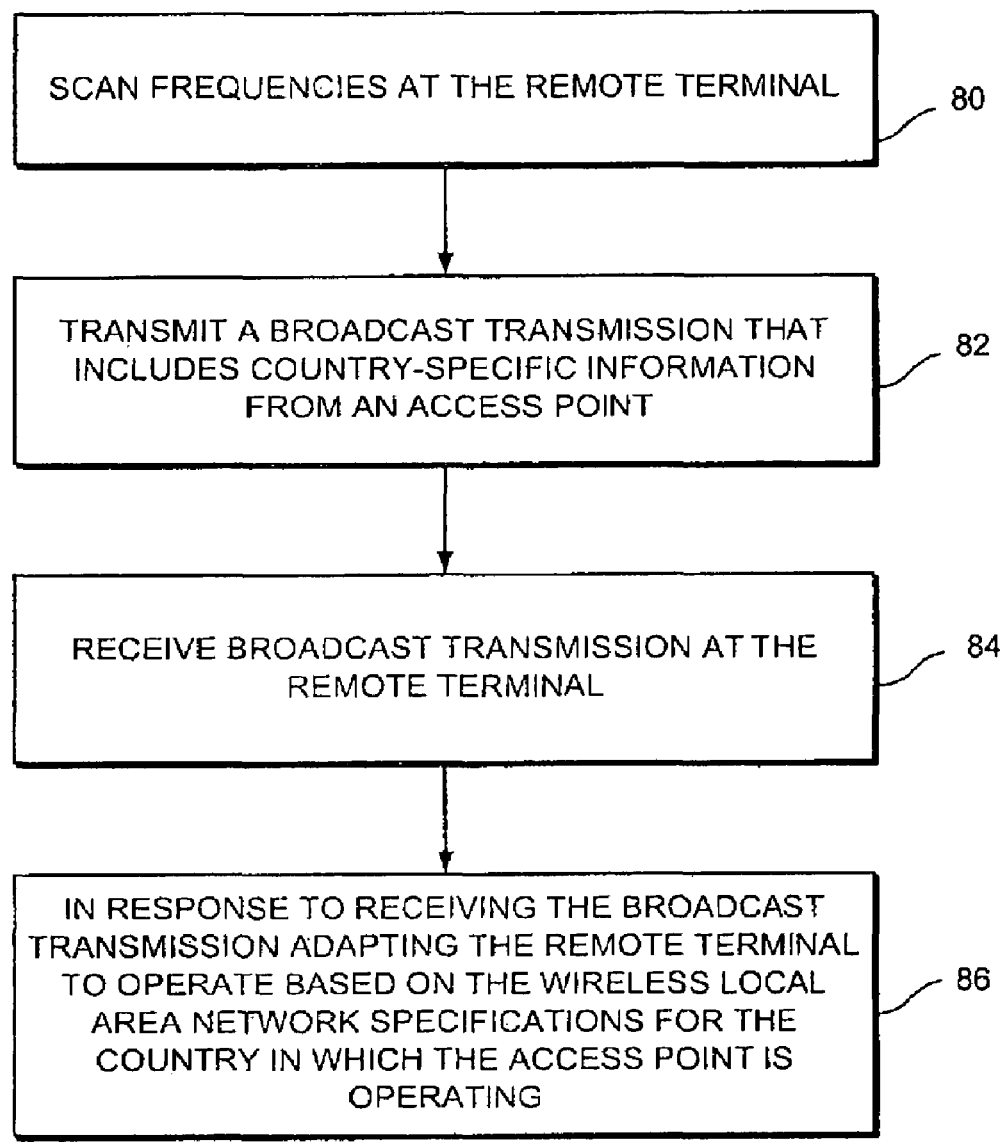
FIG. 5 is a flow diagram of an illustrative method for adapting remote terminals based on country-specific information that is carried in a broadcast transmission in accordance with the present invention.

FIG. 5 is a flow chart showing illustrative steps involved in adapting a remote terminal for use in individual countries or geographic regions based on country specific information that is in a broadcast transmission from an access point. At step 80, a remote terminal may scan frequencies. For example, the remote terminal may scan frequency channels on which it may operate in a plurality of countries. The remote terminal may be scanning to receive a broadcast transmission from an access point when the remote terminal is seeking to associate with an access point. At step 82, an access point may transmit a broadcast transmission that includes country-specific information. For example, an access point that has been installed in a particular country to operate based on WLAN operating specification for that country broadcasts a communications message for any remote terminal within its communication range where the message includes country-specific information, such as the WLAN operating channels for that country. At step 84, the remote terminal may receive the broadcast transmission and the country-specific information included therein. At step 86, in response to receiving the broadcast transmission, the remote terminal adapts to operate based on the WLAN specifications for the country in which the access point is operating (e.g., the remote terminal operates only in the WLAN operating channels for that country while adapted to operate in that country).

Figure 6B:
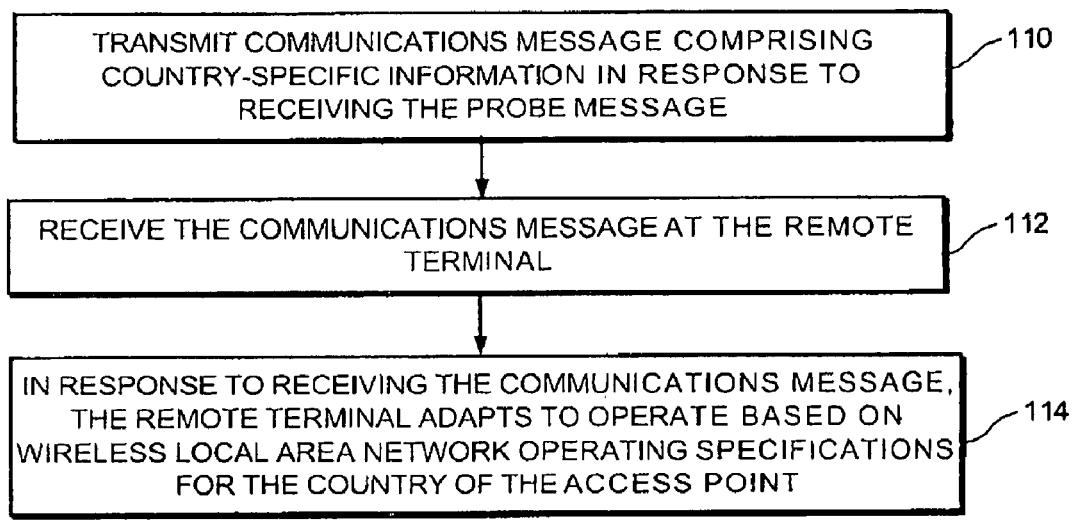

FIGS. 6*a* and 6*b* together show a flow chart of illustrative steps involved in adapting a remote terminal for use in individual countries or geographic regions based on country-specific information that has been requested by the remote terminal. At step 100, a remote terminal may scan frequencies to find a transmitted communication. The remote terminal may be scanning to find a communication channel carrying a communication of a nearby WLAN. The communication may be a broadcast transmission of an access point, or if desired the communication may be a communication message that is typically used in WLAN operation. At step 102, a component (e.g., an access point) of a nearby WLAN may transmit a communication on a particular channel. For example, an access point may transmit a broadcast transmission on one of the frequency channels that are available to WLANs in the country in which the access point is operating. At step 104, the remote terminal may receive the communication. For example, the remote terminal may have been recently activated and may be seeking to associate with an access point when the remote terminal receives a communication that is a broadcast transmission sent on a particular channel. At step 106, the remote terminal may send a probe communications message to the access point. The remote terminal may send the probe message in response to receiving the communication and may send the message on the channel on which the communication was received. The remote terminal may be of the type that may not be able to transmit until knowing a valid channel for communications. If desired, the probe message may have been sent to request information including country-specific information from the access point. At step 108, the access point may receive the probe message. If desired, the access point may locate for the remote terminal country-specific information from information stored at the access point. At step 110, the access point may transmit a communications message comprising country-specific information in response to receiving the probe message from the remote terminal. If desired, country-specific information may have been also included in the communication that the remote terminal received at step 104. At step 112, the remote terminal may receive the communications message. At step 114, the remote terminal may adapt to operate based on WLAN operating specifications for the country of the access point.

Some regulations require that the regulations themselves be displayed to the user. Normally, these regulations would be placed on the outer surface of a remote terminal capable of transmitting in the country. However, since the remote terminal may be capable of transmission in many different countries, this may not be feasible. Therefore, the remote terminal may be configured such that, after the unit has determined the country in which it is located, the proper regulatory information is displayed to the user.

The contents of U.S. Pat. No. 5,029,183 to Tymes, and U.S. Pat. No. 5,668,803 to Tymes et al., both assigned to Symbol Technologies, Inc., are hereby incorporated by reference herein. These patents show systems in which methods and apparatus consistent with the principles of the present invention may be practiced. Each patent describes a system in which hand-held data-gathering mobile remote terminals communicate via wireless link with access points, similar to the system shown in FIG. 1.

If desired, the remote terminal may be configured so that the user must verify the country in which they are located. For example, if the remote terminal determines by looking at a table that it is currently located in Switzerland, a message may appear on a display screen on the remote terminal saying "You are in Switzerland. Is this correct? (Y/N)." The user may then be required to confirm that he or she is indeed in Switzerland before the remote terminal reconfigures its settings to comply with Swiss standards. This reduces the chance of the remote terminal mistakenly configuring itself to specific characteristics that may violate certain regulations.

If desired, a Global Positioning System (GPS) locator may be built into the remote terminal, allowing the unit to verify its location instead of or in addition to requiring confirmation from the user. This feature also reduces the chance of the unit mistakenly configuring itself to specific characteristics which may violate certain regulations.

If desired, the multiple geographic region feature (the feature embodied by the above methods) may be enabled or disabled by a user. When the feature is disabled, the remote terminal merely attempts to establish communication using a communication setting for a particular geographic region. This setting may be, for example, a default setting or the setting in use at the time the remote terminal was last turned off.

Accordingly, the apparatus and methods discussed herein allow for universal remote terminals that adapt to operate in countries world-wide. For example, based on the embodiments discussed herein, every time a remote terminal associates with a new access point in a different country, the remote terminal may adapt to that country's requirements to suitably operate throughout that country.

In one embodiment, remote terminals (e.g., remote terminals 20, 22, and 24 of FIG. 2) are hand-held data-gathering units. An advantage of such apparatus and methods is that for data-gathering remote terminals that are mobile, handheld, compact, etc., users may easily migrate to different countries to use their remote terminals without added cost, complexity, equipment size, etc.

The foregoing is merely illustrative of the principles of this invention and various modifications can be made by those skilled in the art without departing from the scope and spirit of the invention.

What is claimed is:

1. A universal remote terminal for use in wireless local area networks in a plurality of countries, each country having particular communications specifications for operating wireless local area networks in that country, the terminal comprising circuitry configured to:
   scan to find a communications channel carrying a communication for a nearby wireless local area network;
   send a probe communications message on the communication channel in response to finding the communications channel when scanning;
   receive a reply communications message comprising country-specific information from a transmitter in a particular country that was sent in reply to the probe communications message; and
   adapt to that country's communications specifications to suitably operate in wireless local area networks in that country in response to receiving the country-specific information.

2. The universal remote terminal of claim 1 wherein the remote terminal is mobile and handheld, and the remote terminal comprises wireless-network-interface resources comprising the circuitry.

3. The universal remote terminal of claim 1 wherein the remote terminal is a desktop personal computer having wireless-network-interface resources comprising the circuitry.

4. The universal remote terminal of claim 1 wherein the circuitry that is configured to scan is configured to scan frequencies for a broadcast transmission.

5. The universal remote terminal of claim 4 wherein the circuitry that is configured to scan is configured to scan for the broadcast transmission when the terminal seeks to associate with a new access point.

6. The universal remote terminal of claim 1 for use in wireless local area networks in which an access point comprises the transmitter, wherein:
   the circuitry that is configured to scan is configured to scan a plurality of channels to receive a broadcast transmission when seeking to associate with a new access point;
   the circuitry is configured to receive the broadcast transmission on one of the channels; and
   the circuitry that is configured to send the probe communications message is configured to send the probe communications message requesting country-specific information on the one channel in response to receiving the broadcast transmission.

7. The universal remote terminal of claim 6 wherein the circuitry is configured to scan channels on which the terminal is operable.

8. The universal remote terminal of claim 1 wherein the circuitry is configured to include a database of communications specifications for a plurality of countries.

9. The universal remote terminal of claim 1 wherein the circuitry is configured to receive the reply communications message comprising country-specific information on that country's communications specification from the transmitter.

10. The universal remote terminal of claim 9 wherein the circuitry is configured to receive the reply communications message comprising country-specific information comprising a particular set of frequency channels on which wireless local area networks in that country are to operate.

11. The universal remote terminal of claim 9 wherein the circuitry is configured to:
   be operable on a plurality of channels; and
   receive country-specific information on a particular subset of the plurality of channels on which wireless local area networks in that country are to operate.

12. The universal remote terminal of claim 1 wherein the remote terminal uses spread spectrum communications and the circuitry that is configured to receive is configured to receive country-specific information on variable parameters in spread spectrum communications in the reply communications message.

13. The universal remote terminal of claim 1 wherein the circuitry is configured to receive country-specific information on that country's name in the communications message.

14. A method for use in a remote terminal for use in wireless local area networks in a plurality of countries, each country having particular communications specifications for operating of wireless local area networks in that country, the method comprising:
   scanning to find a communications channel carrying a communication for a nearby wireless local area network;
   sending a probe communications message on the communication channel in response to finding the communications channel when scanning;
   receiving a reply communications message comprising country-specific information that was sent by a transmitter in a particular country in reply to the probe communications message; and
   adapting to that country's communications specifications to suitably operate in that country in response to receiving the country-specific information.

15. The method of claim 14 wherein said receiving comprises receiving the communications message at a mobile handheld remote terminal and said adapting comprises adapting at the mobile handheld remote terminal.

16. The method of claim 14 wherein receiving comprises receiving the communications message of the remote terminal where the remote terminal is a desktop personal computer and said adapting comprises adapting of the desktop personal computer.

17. The method of claim 14 wherein said scanning comprises scanning for a broadcast transmission.

18. The method of claim 14 wherein said scanning comprises scanning for the communication that is from an access point when the remote terminal seeks to associate with a new access point.

19. The method of claim 14 wherein:
   said scanning comprises scanning to receive a broadcast transmission from an access point when seeking to associate with a new access point; and
   said sending comprises sending a probe message requesting country-specific information in response to receiving the broadcast transmission.

20. The method of claim 19 wherein:
   said scanning comprises scanning a plurality of channels to receive the broadcast transmission on one of the channels; and
   said sending comprises sending the probe message on the one channel on which the broadcast transmission was received.

21. The method of claim 14 further comprising including a database of communications specifications for a plurality of countries at the remote terminal.

22. The method of claim 14 wherein said receiving comprises receiving country-specific information on that country's communications specification from the transmitter.

23. The method of claim 22 wherein said receiving comprises receiving country-specific information comprising information on a particular set of frequency channels on which wireless local area networks in that country are to operate.

24. The method of claim 22 comprising:
using a plurality of channels to communicate in different countries; and
said receiving comprises receiving country-specific information on a particular subset of the plurality of channels on which wireless local area networks in that country are to operate.

25. The method of claim 14 wherein said receiving comprises receiving country-specific information on variable parameters in spread spectrum communications in the reply communications message.

26. The method of claim 14 wherein said receiving comprises receiving country-specific information on that country's name in the communications message.

27. A system for use in a plurality of countries, each country having particular communications specifications for operating wireless local area networks in that country, comprising:
an access point that is operating in a particular country; and
a remote terminal comprising circuitry configured to:
scan to find a communications channel carrying a communication for a nearby wireless local area network;
send a probe communications message on the communication channel in response to finding the communications channel when scanning;
receive a reply communications message comprising country-specific information that was sent by the access point in reply to the probe communications message; and
responsive to receiving the country-specific information, adapt to that country's communications specifications to suitably operate in that country.

28. The system of claim 27 wherein the remote terminal is mobile and handheld, and the remote terminal comprises wireless-network-interface resources comprising the circuitry.

29. The system of claim 27 wherein the remote terminal is a desktop personal computer having wireless-network-interface resources comprising the circuitry.

30. The system of claim 27 wherein the circuitry that is configured to scan is configured to scan frequencies for a broadcast transmission comprising the communications message.

31. The system of claim 30 wherein the circuitry that is configured to scan is configured to scan for the broadcast transmission when the terminal seeks to associate with a new access point.

32. The system of claim 27 wherein:
the circuitry that is configured to scan is configured to scan to receive a broadcast transmission to receive when seeking to associate with a new access point; and
the circuitry that is configured to send is configured to send the probe communications message requesting country-specific information in response to a received broadcast transmission.

33. The system of claim 32 wherein:
the circuitry that is configured to scan is configured to scan a plurality of channels to receive the broadcast transmission on one of the channels; and
the circuitry that is configured to send is configured to send the probe communications message on the one channel on which the broadcast transmission was received.

34. The system of claim 27 wherein the circuitry is configured to include a database of communications specifications for a plurality of countries.

35. The system of claim 27 wherein the circuitry is configured to receive the reply communications message comprising country-specific information on that country's communications specification from the access point.

36. The system of claim 35 wherein the circuitry is configured to receive the reply communications message comprising country-specific information on a particular set of frequency channels on which wireless local area networks in that country are to operate.

37. The system of claim 35 wherein:
the circuitry is configured to use a plurality of channels; and
the circuitry that is configured to receive is configured to receive country-specific information on a particular subset of the plurality of channels on which wireless local area networks in that country are to operate.

38. The system of claim 27 wherein the remote terminal uses spread spectrum communications and the circuitry that is configured to receive is configured to receive country-specific information on variable parameters of spread spectrum communications in the reply communications message.

39. The system of claim 27 wherein the circuitry that is configured to receive is configured to receive country-specific information on that country's name in the communications message.

40. A method of specifying a regulatory assigned subset of channels from a plurality of frequency channels on which communications between a stationary access point and a mobile terminal can be implemented in a wireless local area network, comprising:
activating the mobile terminal to periodically listen on each of said frequency channels;
sending a broadcast transmission from the access point on one of said frequency channels;
sending a response from the mobile terminal on the one frequency channel to the access point in response to the mobile terminal receiving the broadcast transmission;
transmitting information related to the subset of frequency channels from the access point to the mobile terminal; and
storing the information related to the subset of frequency channels in memory in the mobile terminal to define on which frequency channels the mobile terminal is to operate.

41. The method of claim 40 for use in a wireless local area network that uses spread spectrum communications wherein said transmitting further comprises transmitting information related to parameters for spread spectrum communications.

42. The method of claim 40 wherein said transmitting further comprises transmitting information on country name to the mobile terminal.

43. The method of claim 40 further comprising using a database to define on which frequency channels the mobile terminal is to operate based on the stored information.

* * * * *